United States Patent Office.

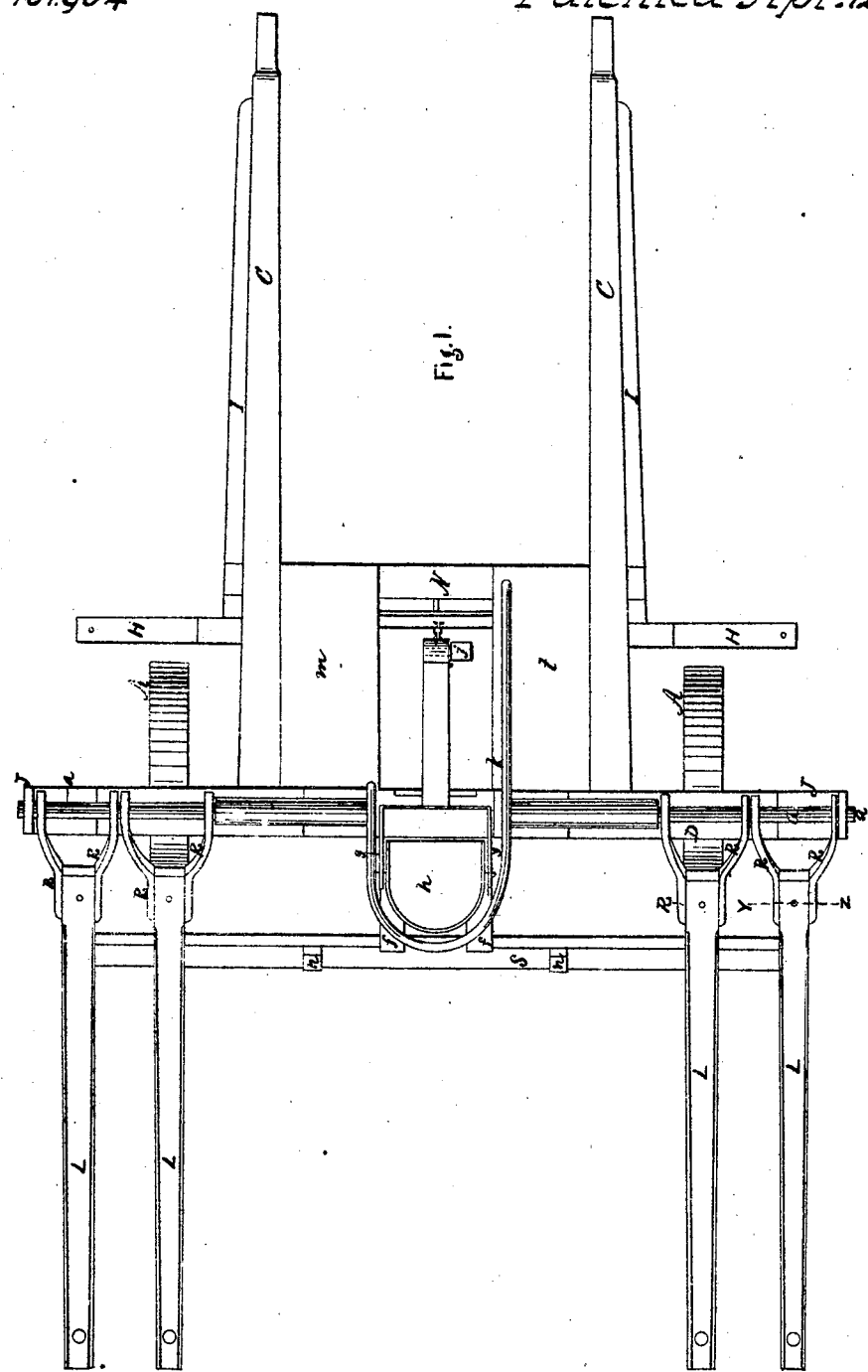

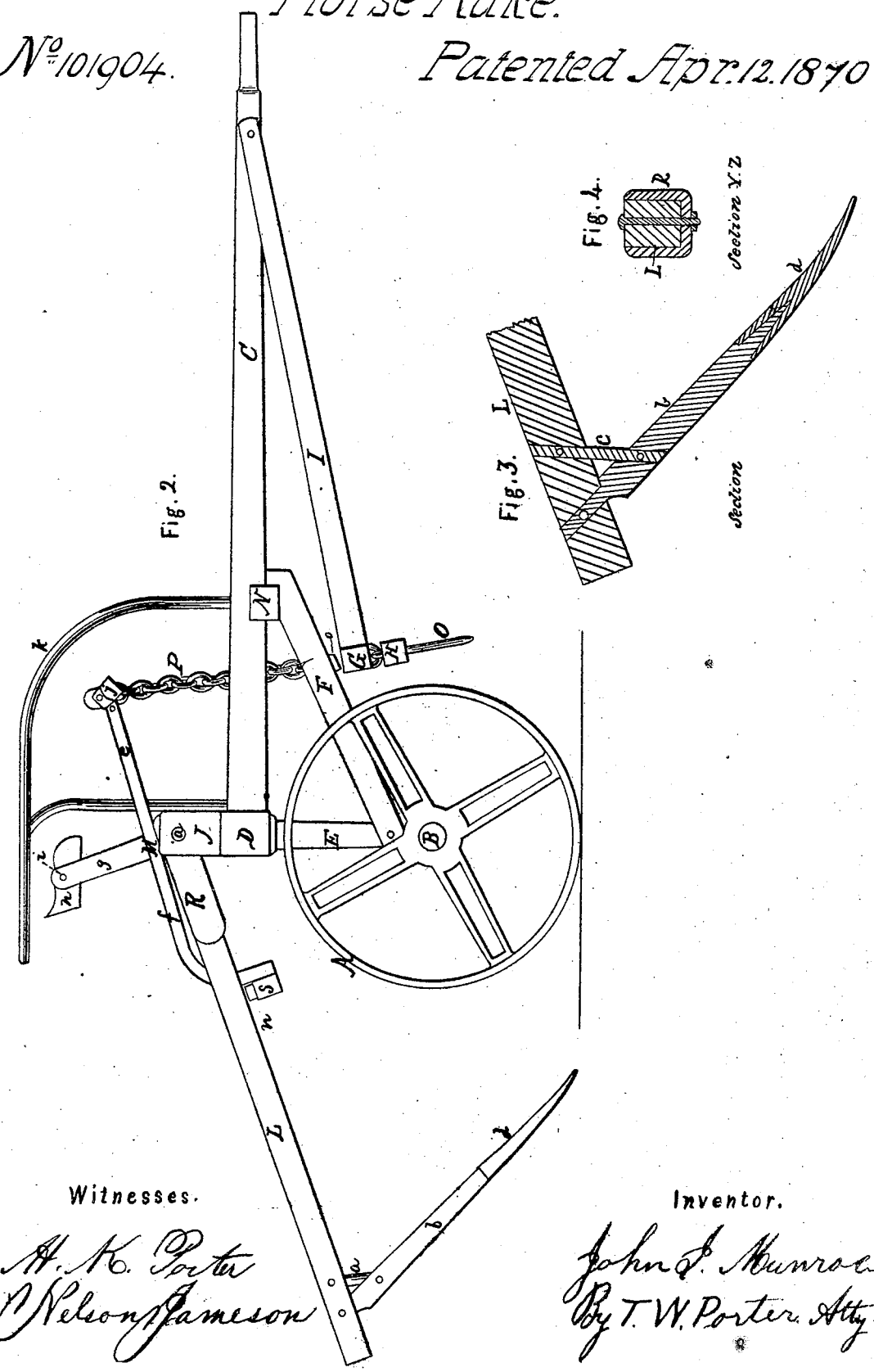

JOHN I. MUNROE, OF WOBURN, MASSACHUSETTS.

Letters Patent No. 101,904, dated April 12, 1870.

IMPROVEMENT IN HORSE HAY-RAKES.

The Schedule referred to in these Letters Patent and making part of the same.

*To all whom it may concern:*

Be it known that I, JOHN I. MUNROE, of Woburn, in the county of Middlesex, and State of Massachusetts, have invented new and useful Improvements in Hay-Rakes; and I do hereby declare that the following is a full, clear, and exact description of the construction and operation of the same, reference being had to the accompanying drawings making a part of this specification, in which—

Figure 1 is a top or plan view;

Figure 2 is a side elevation;

Figure 3 is a detached vertical section of a tooth and its metallic tip; and

Figure 4 is a detached transverse section of the tooth-brackets, taken on the line Y Z, fig. 1.

Similar letters indicate like parts in the several figures.

The nature of my invention consists in certain improvements upon the hay-rake patented by me in the year 1867, known as an independent-tooth rake; the said improvements consisting mainly in pivoting the seat in uprights formed rigidly upon the tilting-bar, and combining a pivoted stirrup therewith.

In the drawings—

A A represents the wheels, and

B, the axle.

C C are the shafts or thills, and

D a bar in which the shafts are secured, and

E represents two uprights, in which axle B revolves, and upon which bar D is securely fastened.

F represents stays or braces which pass from uprights E to the shafts C, as shown.

I represents stays pivoted at their forward ends to shafts C, while the bar G, extending across the rake, is firmly attached to their rear ends.

H is the divider-head, which is attached by a spring hinge to bar G, and

O are the teeth of the divider.

The foregoing parts being substantially the same as in the rake patented as above stated, a more particular description is not deemed necessary.

*o* represents rubber buffers, which are inserted in bar G at the points of contact with braces F, or *vice versa*, so that, when the divider is raised, the buffers shall reduce the shock, and muffle the sound produced by the sudden raising of the divider.

J J are metallic supports, in which the rod $a$ is supported.

R R are metallic couplings, the two prongs of which are pivoted upon rod $a$, while the teeth-bars L are bolted to the broad portion between the vertical flanges, as is plainly shown in fig. 4.

$b$ is the wooden portion of the teeth proper, this portion being connected with the bars L at a suitable acute angle, as shown, and their joining being strengthened by the short stay $c$.

Upon the lower ends of teeth $b$ is secured a metallic socket-point, $d$, by which the teeth are protected from wear or splitting, and in the performance of various kinds of work their penetrability is such that the working of the rake is more satisfactory than with any other teeth.

M is a rocking-bar, which is pivoted to the rod $a$.

Two arms, $ff$, of this bar extend back, and are attached to the tilting-bar S placed beneath the tooth bars L, and the arm $e$ extends forward, and the chain P connects it with the divider, as shown.

$j$ is a stirrup, or foot-rest, which is pivoted in the forward end of arm $e$, while $gg$ are two uprights rigidly attached to or formed upon bar M.

Between these uprights is pivoted the driver's seat, $h$, which is balanced upon the pivot $i$.

$k$ is a hand-rail, the forward end of which is secured in bar M, from whence it passes by an upward curve to the rear of seat $h$, around which it passes, and thence by a downward curve to bar D, in which it is secured.

When in use, and the operator is in seat $h$, he will guide the horse with his left hand, and with his right support himself by the rail $k$, having one foot in rest $j$, and the other upon either of the platforms $l$ or $m$, and when it is desired to raise the rake-teeth to pass the windrow, or for other purposes, he will throw his weight forward upon the rest $j$, being aided by his grasp upon rail $k$, and retaining his seat. He will thus depress the front end and raise the rear end of bar M, whereby the rake-teeth will be elevated, and the divider lowered to the ground, and the latter will clear the space in front of the windrow of the hay, while the rake-teeth pass the windrow, so that the rake-teeth drop into the space thus cleared, and leave no hay trailing behind.

When the operator desires to lower the rake-teeth, it is done by the same means, but by an inverse movement of the body to that of raising them, so that the weight of the operator, by a relative change of position, actuates the rake-teeth, as described.

The chain P may be so attached to a hook or other device that both the rake and divider-teeth shall be held suspended from the ground for the purpose of transportation, and the divider may by the same means be suspended, if it be desired to use the rake separately.

The elastic buffers $n$, which are inserted in tilting-bar S beneath each tooth, prevent shocks and noise when raising or lowering the rake-teeth.

Having fully described my invention,

What I claim as new, and desire to secure by Letters Patent, is—

The combination of seat $h$, pivoted in uprights $gg$, formed rigidly upon tilting-bar M, with pivoted stirrup $j$, substantially as and for the purposes specified.

J. I. MUNROE.

Witnesses:
HENRY HYDE SMITH,
EBEN HUTCHINSON.